US012768727B2

(12) United States Patent
Behruzi

(10) Patent No.: US 12,768,727 B2
(45) Date of Patent: Oct. 20, 2026

(54) METHOD FOR THREE-DIMENSIONAL TEMPERATURE MEASUREMENT AND APPARATUS

(71) Applicant: ArianeGroup GmbH, Taufkirchen (DE)

(72) Inventor: Kei Philipp Behruzi, Bremen (DE)

(73) Assignee: ArianeGroup GmbH, Taufkirchen (DE)

( * ) Notice: Subject to any disclaimer, the term of this patent is extended or adjusted under 35 U.S.C. 154(b) by 334 days.

(21) Appl. No.: 18/501,242

(22) Filed: Nov. 3, 2023

(65) Prior Publication Data

US 2024/0175766 A1 May 30, 2024

(30) Foreign Application Priority Data

Nov. 30, 2022 (EP) .................................... 22210476

(51) Int. Cl.
*G01K 11/28* (2006.01)
*G01N 9/00* (2006.01)

(52) U.S. Cl.
CPC ............... *G01K 11/28* (2013.01); *G01N 9/00* (2013.01)

(58) Field of Classification Search
CPC ...... G01K 11/28; G01K 7/34; G01K 2203/00; G01K 2213/00; G01N 9/00; G01N 9/24
See application file for complete search history.

(56) References Cited

U.S. PATENT DOCUMENTS

2013/0144548 A1* 6/2013 Xie .................... G01N 33/2823 702/65
2017/0212024 A1* 7/2017 Hunt ...................... G01N 27/00
2019/0133111 A1* 5/2019 Fuhr ...................... A01N 1/144
2022/0221417 A1* 7/2022 Zhang ................. G01N 27/221

OTHER PUBLICATIONS

European Search Report for corresponding European Patent Application No. 22210476 dated May 17, 2023; priority document.
Y. Hirose et al., "Noninvasive Measurement of Temperature Distribution in a Pipe by Using Electrical Capacitance Tomography" Innovative Nuclear Power Plant Design and New Technology Application; Jul. 7, 2014; downloaded from the Internet: http://dx.doi.org/10.1115/ICONE22-30004>.
A. Hunt et al., "High-Speed Density Measurement for LNG and other cryogenic fluids using electrical capacitance tomography" Cryogenics, Elsevier, Kidlington, GB, Oct. 24, 2020.

* cited by examiner

*Primary Examiner* — John E Breene
*Assistant Examiner* — Manuel Salvador Castellon, Jr.
(74) *Attorney, Agent, or Firm* — Greer, Burns & Crain, Ltd.

(57) ABSTRACT

A method for measuring a three-dimensional temperature field of a liquid in a receptacle, in particular of cryogenic liquids, wherein a local liquid density is determined by means of electrical capacitance tomography and the local temperature is derived based on the local liquid density and a local liquid pressure, and an apparatus for carrying out such a method.

10 Claims, 1 Drawing Sheet

METHOD FOR THREE-DIMENSIONAL TEMPERATURE MEASUREMENT AND APPARATUS

CROSS-REFERENCES TO RELATED APPLICATIONS

This application claims the benefit of the European patent application No. 22210476.2 filed on Nov. 30, 2022, the entire disclosures of which are incorporated herein by way of reference.

FIELD OF THE INVENTION

The invention relates to a method for measuring a three-dimensional temperature field of a liquid and an apparatus for carrying out such a method.

BACKGROUND OF THE INVENTION

Traditionally, temperature fields are captured by means of temperature sensors. Temperature sensors, however, only provide selective information. To capture a seamless temperature field, an infinite number of temperature sensors would have to be provided. In particular, in the area of cryogenic liquids such as liquid hydrogen in a tank, a conventional temperature measurement is not suitable in order to obtain a three-dimensional temperature field of the liquid.

SUMMARY OF THE INVENTION

An object of the invention is to provide an improved method for measuring a three-dimensional temperature field of a liquid and an apparatus for carrying out such a method.

In a method according to the invention for measuring a three-dimensional temperature field of a liquid in a receptacle, in particular of cryogenic liquids in a tank, a local liquid density is determined by means of electrical capacitance tomography. The local temperature is then derived based on the local liquid density and a local liquid pressure. The three-dimensional temperature field is created through multiple repetitions of the local temperature derivation.

Electrical capacitance tomography (ECT) is characterized by the placement of a series of electrodes at the boundaries of the volume to be characterized. The electrical signals emitted bidirectionally by the electrodes are received by the neighboring electrodes. Electrical capacitance tomography now makes it possible to determine the density of a medium. The changes in density of liquid hydrogen vary in the order of about 10% in a common pressure range for cryogenic hydrogen in a fuel tank of a space rocket engine of 1 bar to 4 bar. The temperature range is then between 20 K and 26 K. It is to be expected that temperature differences under an accuracy of 1 K can be resolved. The data can be captured in their spatial distribution in real time. The method according to the invention enables a precise measurement of a three-dimensional temperature field of a liquid, in particular also of cryogenic liquids such as liquid hydrogen in an engine tank. The method according to the invention is not only suitable under terrestrial conditions and conditions during propelled or accelerated phases, but also under microgravity and in the absence of gravity in space.

The liquid density is preferably determined from the dielectric constant. This is because the strength of the received electrical signal depends on the dielectric constant of the medium, which depends on the density of the enclosed medium. In particular, it is preferable for the liquid density to be determined from the dielectric constant for the saturated state. This is because the liquid is then at the boiling point and the density forms a (linear) functional relationship with the dielectric constant.

Preferably, a plurality of individual pressure measurement values is captured in the receptacle (pressure sensor array) and the local pressure is determined from the individual pressure measurement values. The determination can occur by means of a suitable estimation method. By this means, the local pressure can be indicated with precision.

Alternatively, the local pressure can also be determined by the electrical capacitance tomography itself. As the distribution of the liquid in the receptacle can be determined by means of electrical capacitance tomography and, when the receptacle moves, such as in an accelerated phase, the acceleration (direction) is known, the pressure can be calculated without a plurality of conventional pressure sensors, but rather can be estimated from the measurement itself if the pressure in the gas space is known.

Preferably, when the density for the saturated state and the pressure are known, the local temperature is derived by means of a materials database. Materials databases allow a quick access without complex calculations.

An apparatus according to the invention for carrying out the method according to the invention has an electrical capacitance tomography device for determining a local liquid density, a pressure measurement device for measuring a local liquid pressure and a device for ascertaining the local temperature of the liquid from the local liquid density and the local liquid pressure.

Such an apparatus enables a precise capture of a three-dimensional temperature field, in particular also for cryogenic liquids such as liquid hydrogen in a fuel tank.

The pressure measurement device can comprise a plurality of pressure measurement sensors, which are preferably evenly distributed around the inner perimeter of the receptacle, so that individual pressure measurement values are captured in different areas of the receptacle.

Alternatively, the pressure measurement device can comprise just one pressure sensor by means of which the pressure can be calculated during ballistic flight phases, since the hydrostatic forces are low or negligible.

Preferably, the device for ascertaining the local temperature of the liquid from the local liquid density and the local liquid pressure is a materials database. Materials databases can be created in advance for each receptacle, i.e., each tank and its liquid.

BRIEF DESCRIPTION OF THE DRAWINGS

Preferred example embodiments of the invention are explained in greater detail in the following by means of highly simplified schematic illustrations.

DETAILED DESCRIPTION OF THE PREFERRED EMBODIMENTS

Figure 1:
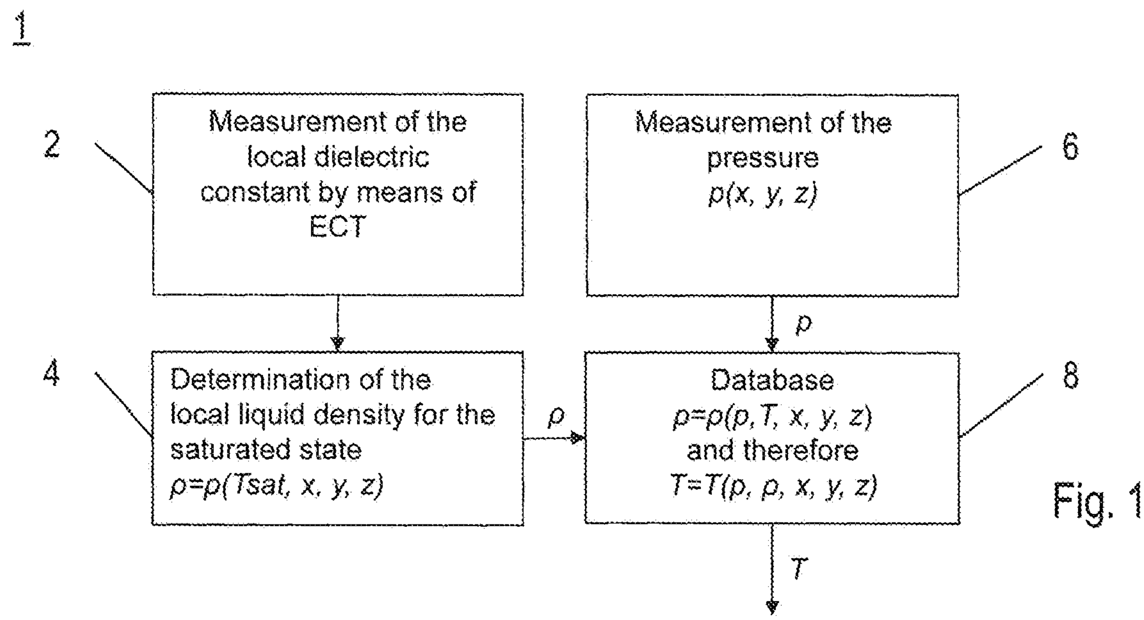
FIG. 1 shows a method according to the invention for measuring a three-dimensional temperature field of a liquid.

FIG. 1 schematically shows a method or measurement principle 1 according to the invention for determining a local liquid temperature T for the measurement of a three-dimensional temperature field of a liquid in a receptacle. An example of a liquid is cryogenic rocket fuel such as liquid hydrogen in a fuel tank of a space rocket engine.

In a first step 2, a local dielectric constant is measured by means of electrical capacitance tomography.

Subsequently, in a next step 4, a local density ρ of the liquid is determined for the saturated state (saturation temperature Tsat), i.e., assuming that the liquid temperature T is at the boiling point, while taking into account the local dielectric constant. In the saturation state, the dielectric constant and the density p form a (linear) functional relationship.

A pressure p of the liquid is additionally calculated in a step 6.

In a next step 8, the local temperature T is ascertained from the previously determined density ρ and the pressure p by means of a materials database.

The local hydrostatic forces can often be neglected, which is usually justifiable at least in the case of liquid hydrogen due to its low density (~70 kg/$m^3$). The expected error in the temperature measurement is then small or negligible.

It is further noted that liquids can occur in either a supercooled or saturated state. Superheated liquids, which occur e.g., in the case of liquid hydrogen in the order of about 0.1 K, can be neglected before they enter the boiling state.

Figure 2:
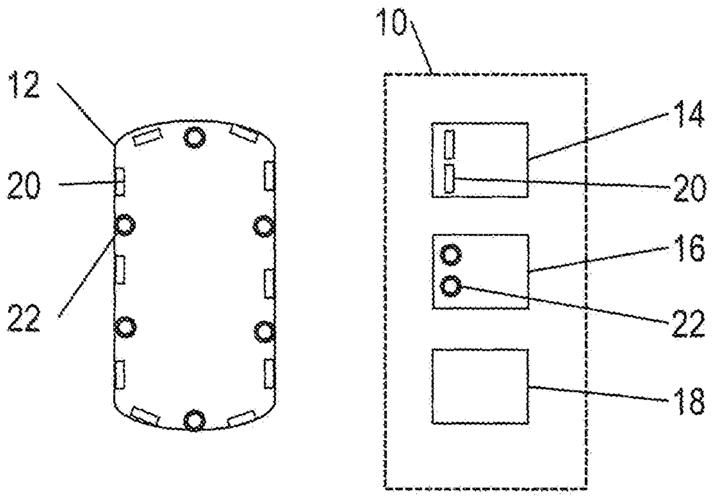
FIG. 2 shows an apparatus according to the invention for carrying out the method shown in FIG. 1.

FIG. 2 schematically illustrates an apparatus 10 according to the invention. The apparatus 10 is associated with a liquid receptacle 12 and has an electrical capacitance tomography device 14 for determining a liquid density ρ, a pressure measurement device 16 for measuring a local liquid pressure p in the receptacle 12 and a device 18 for ascertaining the local temperature T of the liquid from the local liquid density ρ and the local liquid pressure p.

The electrical capacitance tomography device 14 has a plurality of ECT sensors arranged (preferably evenly) on the inside of the receptacle, for example in the form of plate-shaped electrodes 20.

The pressure measurement device 16 preferably comprises a plurality of pressure sensors 22 (pressure sensor array) distributed (preferably evenly) on the inside of the receptacle 12.

In the example embodiment shown, the device 18 for ascertaining the local temperature T of the liquid is a materials database from which a temperature T at a given density ρ and given pressure p can be read out for a particular liquid.

A control and monitoring device of the apparatus 10 is not shown, as these are known to a person of skill in the art. The systems and devices described herein may include a controller, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

In a first alternative (not shown) to the pressure sensor array, only one pressure sensor 22 is provided for measuring pressure, by means of which the pressure p is then calculated during ballistic flight phases. During such flight phases, the hydrostatic forces are low or negligible.

A second alternative (not shown) to the pressure sensor array requires just one pressure sensor, namely when the local pressure is estimated from the electrical capacitance tomography itself.

Disclosed are a method for measuring a three-dimensional temperature field of a liquid in a receptacle, in particular of cryogenic liquids, wherein a local liquid density is determined by means of electrical capacitance tomography and the local temperature is derived based on the local liquid density and a local liquid pressure, and an apparatus for carrying out such a method.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for measuring a three-dimensional temperature field of a liquid in a receptacle, comprising:
   - measuring, via an electrical capacitance tomography device, a local dielectric constant of the liquid in the receptacle,
   - measuring, via a pressure measurement device, a local liquid pressure of the liquid in the receptacle,
   - determining a local liquid density of the liquid via electrical capacitance tomography utilizing the local dielectric constant, and
   - deriving a local temperature of the liquid based on the local liquid density and the local liquid pressure.

2. The method according to claim 1, wherein the liquid is a cryogenic liquid.

3. The method according to claim 1, wherein the liquid density is determined from the dielectric constant for a saturated state of the liquid.

4. The method according to claim 1, wherein a plurality of individual pressure measurement values are captured in the receptacle and the local pressure is determined from the individual pressure measurement values.

5. The method according to claim 1, wherein a pressure measurement is carried out by just one pressure sensor and the local pressure is determined via electrical capacitance tomography.

6. The method according to claim 1, wherein the local temperature is ascertained from a materials database of the liquid.

7. An apparatus for carrying out the method according to claim 1, comprising:
   - the electrical capacitance tomography device configured to measure the local dielectric constant,
   - the pressure measurement device configured to measure the local liquid pressure, and
   - a device configured to determine the local liquid density utilizing the local dielectric constant and to ascertain the local temperature of the liquid from the local liquid density and the local liquid pressure.

8. The apparatus according to claim 7, wherein the pressure measurement device comprises a plurality of pressure sensors.

9. The apparatus according to claim 7, wherein the pressure measurement device comprises exactly one pressure sensor.

10. The apparatus according to claim 7, wherein the device configured to ascertain the local temperature of the liquid from the local liquid density and the local liquid pressure is a materials database.

* * * * *